United States Patent
Ishido

(10) Patent No.: US 10,491,770 B2
(45) Date of Patent: Nov. 26, 2019

(54) IMAGE READING APPARATUS WITH SKEW FEED CORRECTION AND IMAGE READING METHOD THEREOF

(71) Applicant: CANON KABUSHIKI KAISHA, Tokyo (JP)

(72) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/334,089

(22) Filed: Oct. 25, 2016

(65) Prior Publication Data

US 2017/0126915 A1  May 4, 2017

(30) Foreign Application Priority Data

Nov. 4, 2015 (JP) .................................. 2015-216635

(51) Int. Cl.
*H04N 1/00* (2006.01)
*H04N 1/387* (2006.01)

(52) U.S. Cl.
CPC ....... *H04N 1/00793* (2013.01); *H04N 1/0057* (2013.01); *H04N 1/0071* (2013.01); *H04N 1/00323* (2013.01); *H04N 1/00615* (2013.01); *H04N 1/00718* (2013.01); *H04N 1/3878* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,678,071 B1 * | 1/2004 | Saito et al. | 358/1.2 |
| 6,718,071 B2 * | 4/2004 | Yoshida et al. | 382/289 |
| 8,018,629 B2 | 9/2011 | Watanabe | 358/474 |
| 8,174,737 B2 | 5/2012 | Kato et al. | 358/474 |
| 8,284,463 B2 | 10/2012 | Kato et al. | 358/488 |
| 8,477,390 B2 | 7/2013 | Iwayama | 358/488 |

(Continued)

FOREIGN PATENT DOCUMENTS

| | | |
|---|---|---|
| JP | 2002-300367 | 10/2002 |
| JP | 2004-048282 | 2/2004 |

(Continued)

OTHER PUBLICATIONS

U.S. Appl. No. 15/334,086, filed Oct. 25, 2016.

(Continued)

*Primary Examiner* — Thomas D Lee
(74) *Attorney, Agent, or Firm* — Venable LLP

(57) ABSTRACT

Provided is an image reading apparatus capable of accurately detecting an inclination amount of an original image by recognizing an edge part of the original image with high precision even when dust, stain, or the like adheres to a background part. The image reading apparatus includes: an original reader configured to read an image of an original; and a volume resistor configured to represent an original width of the original by a resistance value. The image reading apparatus further includes: a skew feed amount detector configured to set a predetermined range including the edge part of the original in a width direction as an edge detection range based on the original width, to acquire an edge image being the edge part of the original from an image within the edge detection range.

15 Claims, 16 Drawing Sheets

(56) References Cited

U.S. PATENT DOCUMENTS

| | | | |
|---|---|---|---|
| 9,883,065 B2* | 1/2018 | Yamada | H04N 1/00779 |
| 2009/0185240 A1 | 7/2009 | Kato et al. | 358/474 |
| 2017/0078506 A1* | 3/2017 | Yamada | H04N 1/00779 |

FOREIGN PATENT DOCUMENTS

| | | |
|---|---|---|
| JP | 2008-124828 | 5/2008 |
| JP | 2013-115617 | 6/2013 |
| JP | 2013-123119 | 6/2013 |
| JP | 2014-116676 | 6/2014 |
| JP | 2014-230222 | 12/2014 |

OTHER PUBLICATIONS

U.S. Appl. No. 15/334,078, filed Oct. 25, 2016.
Office Action dated Jul. 16, 2019 in counterpart Japanese Application No. 2015-216635, together with English Translation thereof.

* cited by examiner

| ORIGINAL SIZES ARE NOT MIXED | | |
| --- | --- | --- |
| ORIGINAL WIDTH DETECTION RESULT | EDGE DETECTION RANGE L | EDGE DETECTION RANGE R |
| 182mm | −93mm〜−89mm | +93mm〜+89mm |
| 210mm | −107mm〜−103mm | +107mm〜+103mm |
| 257mm | −130mm〜−126mm | +130mm〜+126mm |
| 297mm | −150mm〜−146mm | +150mm〜+146mm |
| | EDGE DETECTION RANGES ARE EXPRESSED WITH CENTER OF ORIGINAL TRAY AS REFERENCE | |

| ORIGINAL SIZES ARE MIXED | |
| --- | --- |
| ORIGINAL WIDTH DETECTION RESULT | EDGE DETECTION RANGE |
| 182mm | −93mm〜+93mm |
| 210mm | −107mm〜+107mm |
| 257mm | −130mm〜+130mm |
| 297mm | −150mm〜+150mm |
| | EDGE DETECTION RANGES ARE EXPRESSED WITH CENTER OF ORIGINAL TRAY AS REFERENCE |

FIG. 17

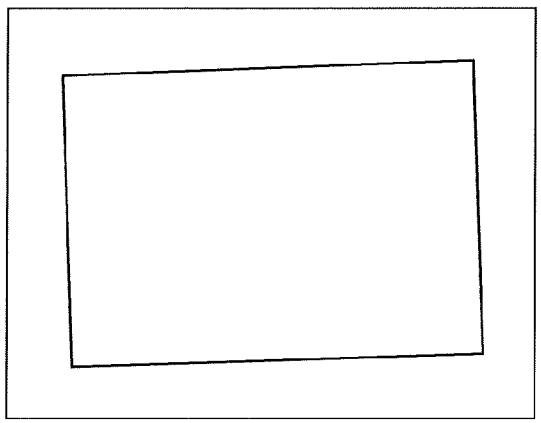
DIGITAL IMAGE DATA SUBJECTED
TO SHADING PROCESSING
⇩ SKEW FEED
CORRECTION
PROCESSING
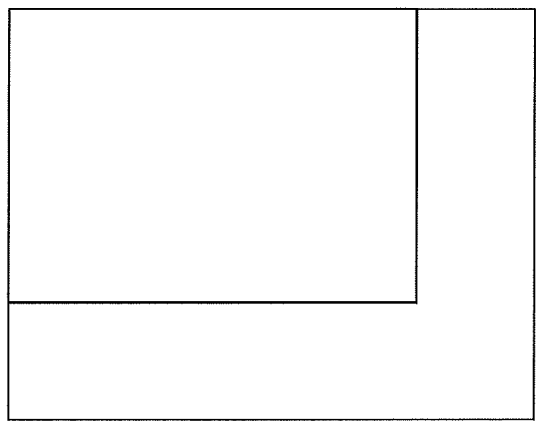
IMAGE DATA
FIG. 18

IMAGE READING APPARATUS WITH SKEW FEED CORRECTION AND IMAGE READING METHOD THEREOF

BACKGROUND OF THE INVENTION

Field of the Invention

The present invention relates to an image reading apparatus, e.g., a scanner, which is configured to read an image (hereinafter referred to as "original image") of an original.

Description of the Related Art

An image reading apparatus is provided in an image forming apparatus, e.g., a copier or a multifunction apparatus, and is used to read an original image in copying or facsimile transmission. Moreover, the image reading apparatus may be connected to an information processing apparatus, e.g., a personal computer, and be used as a scanner. The image reading apparatus may include an original conveying apparatus, e.g., an automatic document feeder (ADF). The image reading apparatus including the original conveying apparatus is configured to continuously take in originals from the original conveying apparatus one by one, and to continuously read original images while conveying the taken-in originals. The image reading apparatus can effectively read the original images by continuously taking in the originals from the original conveying apparatus.

To read an original image, the image reading apparatus irradiates an original being conveyed with light, and receives reflected light from the original. The image reading apparatus converts the received reflected light into an electric signal to generate image data representing the read original image. The image reading apparatus reads the original image by irradiating the original with light assuming that a direction perpendicular to a conveying direction of the original is a main scanning direction. When the original is conveyed with inclination with respect to the main scanning direction, the image reading apparatus reads the original image in an inclined state. In order to correct the inclination of the original image, there is proposed an image reading apparatus configured to detect the inclination of an original being conveyed and to conduct inclination correction (US Patent Application Publication No. 2009/0185240). Further, there is proposed an image reading apparatus having enhanced reliability in detection of an edge part of the original image conducted when an inclination amount of the original image is detected (Japanese Patent Application Laid-open No. 2013-123119). The image reading apparatus disclosed in Japanese Patent Application Laid-open No. 2013-123119 is configured to read an image having an area wider than an original and to detect the inclination amount of the original image by inferring the area of the original image by analogy from a reading result based on a size of the original and a detection result of the edge part of the read image.

When dust, a stain, or the like adheres to a background part of the original, the image reading apparatus reads the dust, the stain, or the like in the background part as an image. When detecting the edge part of the original image from the image including the dust, the stain, or the like, the image reading apparatus sometimes erroneously recognizes the dust, the stain, or the like as the edge part of the original image. The erroneous recognition of the edge part of the original image inhibits the inclination amount of the original from being detected accurately. The present invention has a primary object to provide an image reading apparatus capable of recognizing the edge part of the original image with high precision even when dust, a stain, or the like adheres to the background part and accurately detecting the inclination amount of the original.

SUMMARY OF THE INVENTION

An image reading apparatus according to the present disclosure includes a tray on which an original is to be placed; a conveying unit configured to convey the original placed on the tray; an original width detector configured to detect a size of the original in a width direction perpendicular to a conveying direction of the original; an image reader configured to read an image of the original being conveyed by the conveying unit to output image data; a skew feed amount detector configured to: set an edge detection range in the width direction based on the size of the original in the width direction detected by the original width detector; detect an edge part of the original based on the image data within the edge detection range; and detect a skew feed amount from the width direction of the original based on the edge part; and a skew feed corrector configured to conduct skew feed correction for the image data based on the skew feed amount.

Further features of the present invention will become apparent from the following description of exemplary embodiments (with reference to the attached drawings).

BRIEF DESCRIPTION OF THE DRAWINGS

FIG. 17 is tables for showing a specific example of edge detection ranges corresponding to original sizes.

FIG. 18 is an explanatory diagram of skew feed correction.

DESCRIPTION OF THE EMBODIMENTS

Now, an embodiment of the present invention is described in detail with reference to the drawings.

Figure 1:
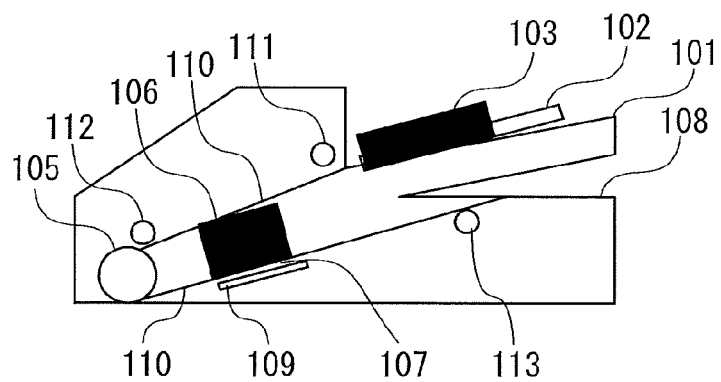
FIG. 1 is a block diagram of an image reading apparatus.

FIG. 1 is a block diagram of an image reading apparatus provided with an original conveying mechanism. The image reading apparatus includes an original tray 101, an original conveying motor 105, an image reader as an image reading unit 106, and a delivery tray 108. On the original tray 101, at least one rectangular original 102 is placed. A sheet feeding roller 111, a conveying roller 112, and a delivery roller 113 are provided along a conveyance route 110 of the original 102. The sheet feeding roller 111, the conveying roller 112, and the delivery roller 113 are driven by the original conveying motor 105.

The original tray 101 is provided with two original guides 103 side by side in a direction perpendicular to a conveying direction of the original 102. In this specification, the direction perpendicular to the conveying direction of the original 102 is referred to as "width direction of the original 102". The two original guides 103 are slidable in the width direction of the original 102, and are configured to sandwich the original 102 placed on the original tray 101 for registration. The sheet feeding roller 111 is configured to take in the originals 102 placed on the original tray 101 one by one. The conveying roller 112 is configured to convey the original 102 taken in by the sheet feeding roller 111 to the image reader 106. An original background plate 109 is provided in a position opposed to the image reader 106 across the conveyance route 110. The image reader 106 forms an image reading position 107 between the image reader 106 and the original background plate 109. The image reader 106 is configured to read an original image when the original 102 conveyed by the conveying roller 112 passes through the image reading position 107. The original 102 having the original image read is delivered from the image reading position 107 onto the delivery tray 108 by the delivery roller 113.

Figure 2:
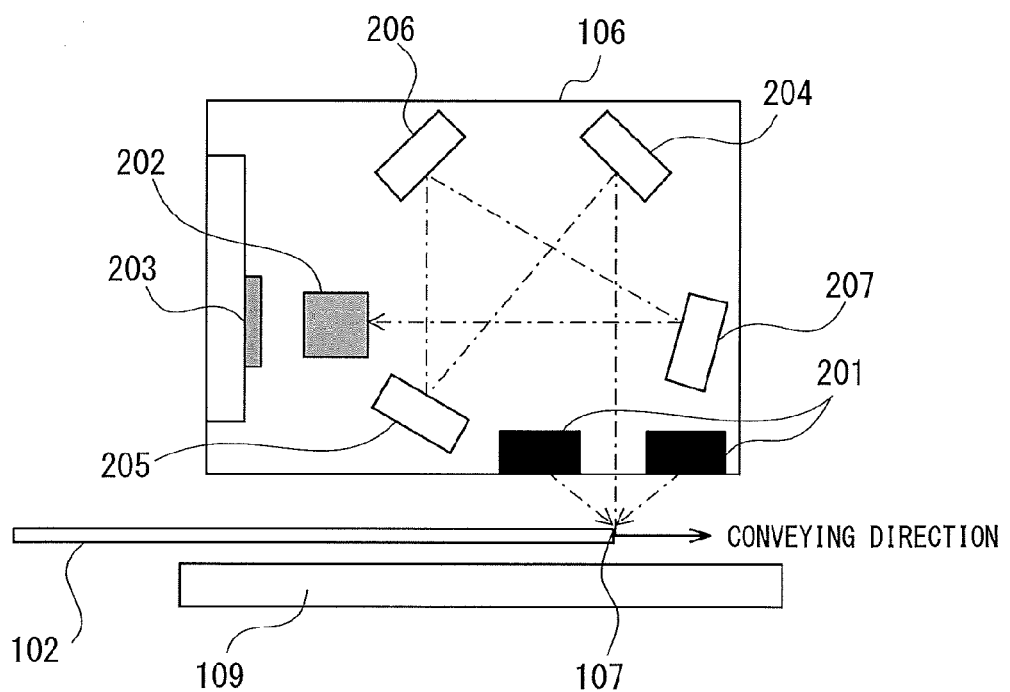
FIG. 2 is a block diagram of an image reader.

FIG. 2 is a block diagram of the image reader 106. The image reader 106 includes a light emitting diode (LED) light source 201, a lens 202, a charge coupled device (CCD) line sensor 203, and mirrors 204 to 207.

The LED light source 201 is configured to apply light to the original 102 passing through the image reading position 107. The LED light source 201 is formed of a plurality of light-emitting elements (LED elements) side by side along the width direction of the original 102. Hence, the main scanning direction of the image reader 106 corresponds to the width direction of the original 102. A sub-scanning direction corresponds to the conveying direction of the original 102.

The light applied to the original 102 by the LED light source 201 is reflected by the original 102. The light reflected by the original 102 is reflected by the mirrors 204 to 207, and is guided to the lens 202. The lens 202 is configured to condense the reflected light on a light-receiving surface of the CCD line sensor 203. The CCD line sensor 203 has a rectangular light-receiving surface having a long side extending in the main scanning direction. The CCD line sensor 203 is configured to receive the reflected light condensed on the light-receiving surface and to photoelectrically convert the reflected light to generate analog image data being an electric signal representing the original image.

Figure 3A:
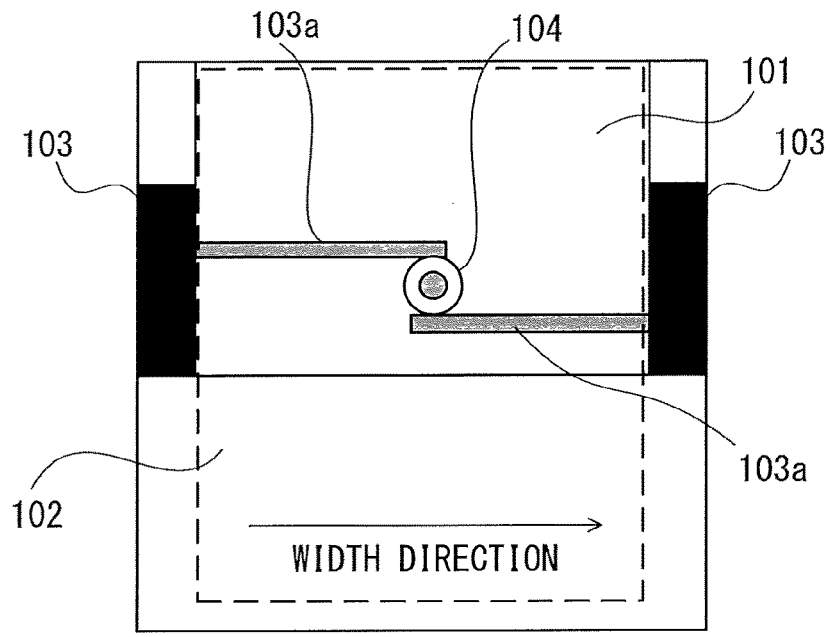
FIG. 3A and FIG. 3B are top views of the image reading apparatus.
Figure 3B:
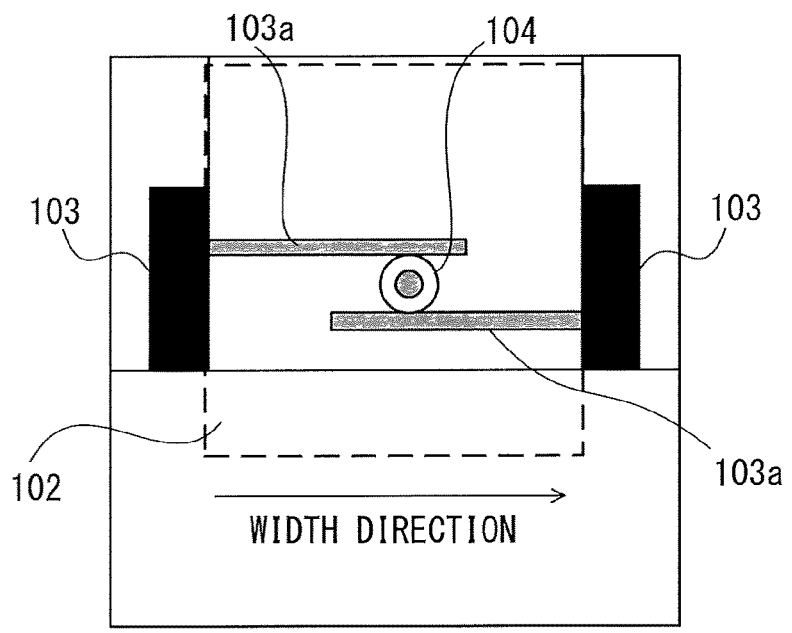

FIG. 3A and FIG. 3B are top views of the image reading apparatus. The image reading apparatus can detect a size (original width) of the original 102 in the width direction placed on the original tray 101 by detecting an interval between the two original guides 103 provided to the original tray 101.

A volume resistor 104 configured to detect the original width is provided between the two original guides 103. The two original guides 103 are respectively connected to the volume resistor 104 through protruding parts 103a. When the two original guides 103 slide in a width direction, a resistance value of the volume resistor 104 fluctuates in association with the sliding. When the original 102 having a maximum width that can be read by the image reading apparatus is placed on the original tray 101, as illustrated in FIG. 3A, the interval between the two original guides 103 is maximum. In this case, the resistance value of the volume resistor 104 is minimum. When the original 102 has a small width, as illustrated in FIG. 3B, the interval between the two original guides 103 is short. In this case, the resistance value of the volume resistor 104 is large. The resistance value of the volume resistor 104 linearly changes in association with the interval between the two original guides 103. This allows the image reading apparatus to detect the original width of the original 102 placed on the original tray 101 based on the resistance value. The original width may be detected without using the volume resistor 104. For example, a plurality of sensors may be arrayed in the width direction of a surface of the original tray 101 on which the original 102 is placed so that the original width is detected from detection results of the respective sensors.

In FIG. 3A and FIG. 3B, the original width is detected with a center of the original 102 in the width direction as a reference. The original 102 is placed so that the center in the width direction is aligned with the center in the width direction of the original tray 101. The two original guides 103 are controlled to slide based on the original width of the placed original 102. In another case, the original width may be detected with one end portion of the original 102 in the width direction as a reference. In this case, one of the original guides 103 is fixed, while the other original guide 103 is slidable. The original 102 is placed so that the one end portion in the width direction serving as the reference is brought into abutment with the one of the original guides 103 that is fixed. When the other original guide 103 is controlled to slide, the resistance value of the volume resistor 104 fluctuates, and the original width is detected.

Figure 4:
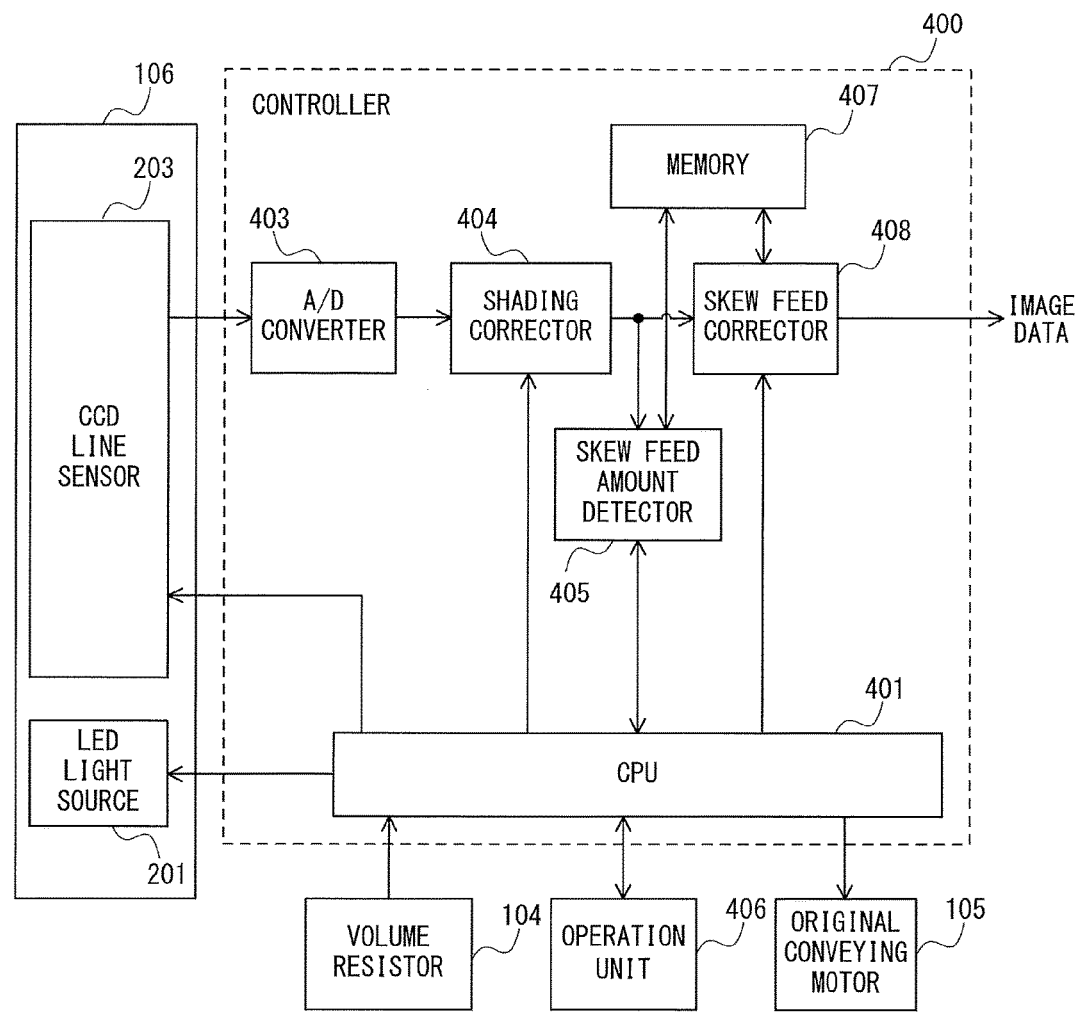
FIG. 4 is a block diagram of a controller.

FIG. 4 is a block diagram of a controller configured to control an operation of the image reading apparatus. A controller 400 is built into the image reading apparatus. The controller 400 includes a central processing unit (CPU) 401, an A/D converter 403, a shading corrector 404, a skew feed amount detector 405, a memory 407, and a skew feed corrector 408. Each component of the controller 400 is formed of a processor, for example, an application specific integrated circuit (ASIC) or a system on a chip (SOC). The controller 400 is connected to the original conveying motor 105 and the image reader 106 (LED light source 201 and CCD line sensor 203), and is configured to conduct conveyance control of the original 102 by the original conveying motor 105 and image reading control by the image reader 106. The controller 400 acquires the analog image data representing the original image from the CCD line sensor 203, conducts image processing, for example, skew feed correction, and generates and outputs image data. The generated image data is used for copying, facsimile transmission, transmission to a personal computer, or the like.

The controller 400 is connected to the volume resistor 104, and is configured to detect the resistance value of the volume resistor 104. The controller 400 is connected to an operation unit 406. The operation unit 406 includes an input device, e.g., an input button. The operation unit 406 is further configured to receive an instruction to start image reading processing or an instruction to specify an original size, which is issued by a user, and to transmit the instruction to the controller 400. Further, the operation unit 406 includes an output device, e.g., a display. The operation unit 406 is further configured to display a message or the like under control of the controller 400.

The central processing unit (CPU) 401 is configured to conduct the image reading processing by controlling operations of the respective components of the image reading apparatus. The CPU 401 is further configured to conduct light emission control of the LED light source 201, the conveyance control of the original 102 by the original conveying motor 105, photoelectric conversion of the received reflected light by the CCD line sensor 203, and the like. The CPU 401 conducts the image reading processing based on the user's instruction input through the operation unit 406. The CPU 401 is further configured to detect the interval between the two original guides 103, which is equal to the original width of the original 102 placed on the original tray 101, based on the resistance value of the volume resistor 104.

The A/D converter 403 is configured to convert the analog image data input from the CCD line sensor 203 into digital image data. The shading corrector 404 is configured to process the digital image data to correct nonuniformity of a light amount of the LED light source 201 and an influence of a pixel sensitivity of the CCD line sensor 203 (shading correction).

The skew feed amount detector 405 is configured to detect a skew feed amount (inclination) of the original 102 with respect to the width direction based on the digital image data corrected by the shading corrector 404. The skew feed amount detector 405 inputs the detected skew feed amount to the CPU 401. The skew feed corrector 408 is configured to store the digital image data corrected by the shading corrector 404 in the memory 407, and to conduct the skew feed correction for the digital image data based on the skew feed amount specified by the CPU 401 to generate the image data. The skew feed corrector 408 outputs the generated image data. The digital image data stored in the memory 407 is read by the skew feed corrector 408 in the skew feed correction, and is read by the skew feed amount detector 405 in detection of the skew feed amount.

Figure 5:
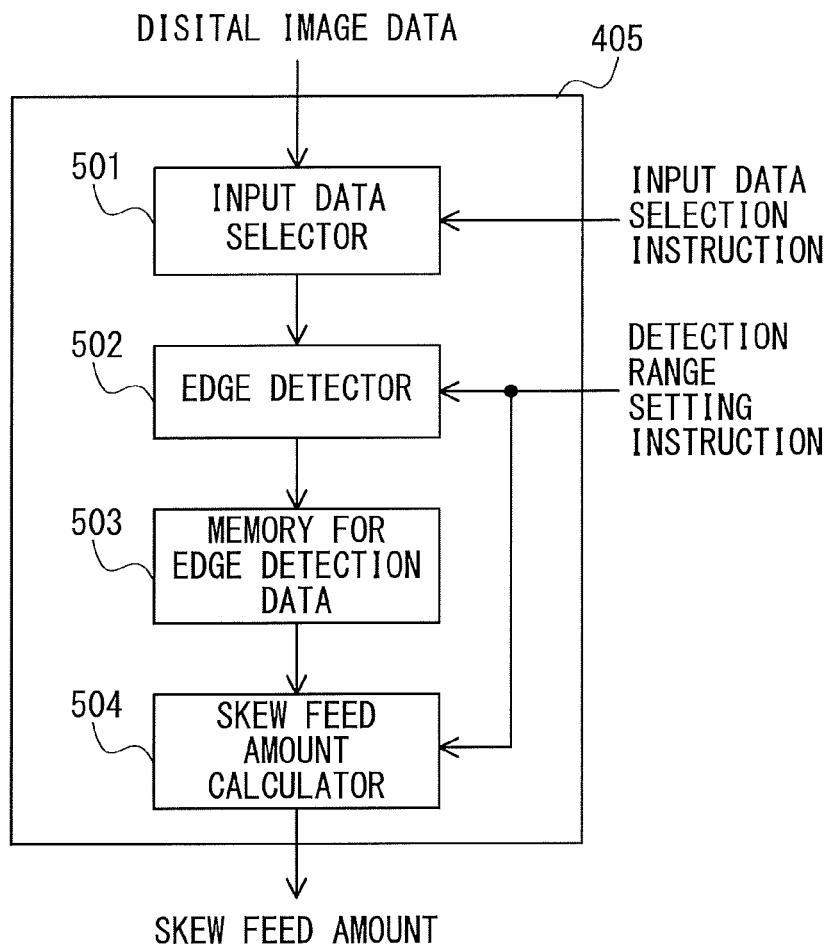
FIG. 5 is a block diagram of a skew feed amount detector.

FIG. 5 is a block diagram of details of the skew feed amount detector 405. The skew feed amount detector 405 includes an input data selector 501, an edge detector 502, a memory 503 for edge detection data, and a skew feed amount calculator 504.

The input data selector 501 is configured to select any one of the digital image data received from the shading corrector 404 and the digital image data received from the memory 407 based on an input data selection instruction received from the CPU 401, and to transmit the selected digital image data to the edge detector 502. The edge detector 502 is configured to conduct edge detecting processing for the digital image data acquired from the input data selector 501, and to detect an edge part of the original image. The edge detector 502 acquires a detection range setting instruction to specify a range to be subjected to edge detection from the CPU 401, and to detect the edge part within the specified edge detection range. A result of the edge detecting processing is stored in the memory 503 for the edge detection data.

Figures 6A, 6B:
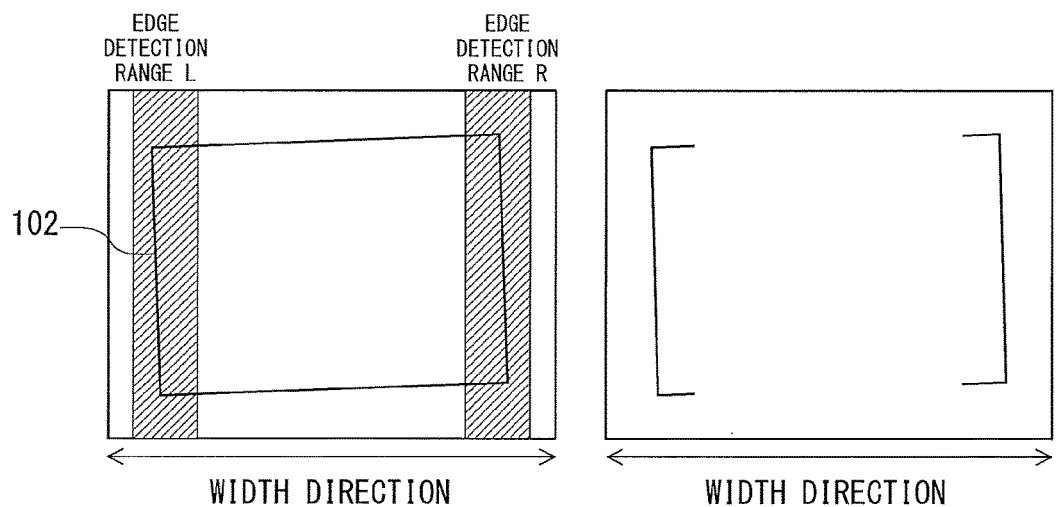
FIG. 6A, FIG. 6B, FIG. 6C, and FIG. 6D are explanatory diagrams of edge detecting processing.
Figures 6C, 6D:
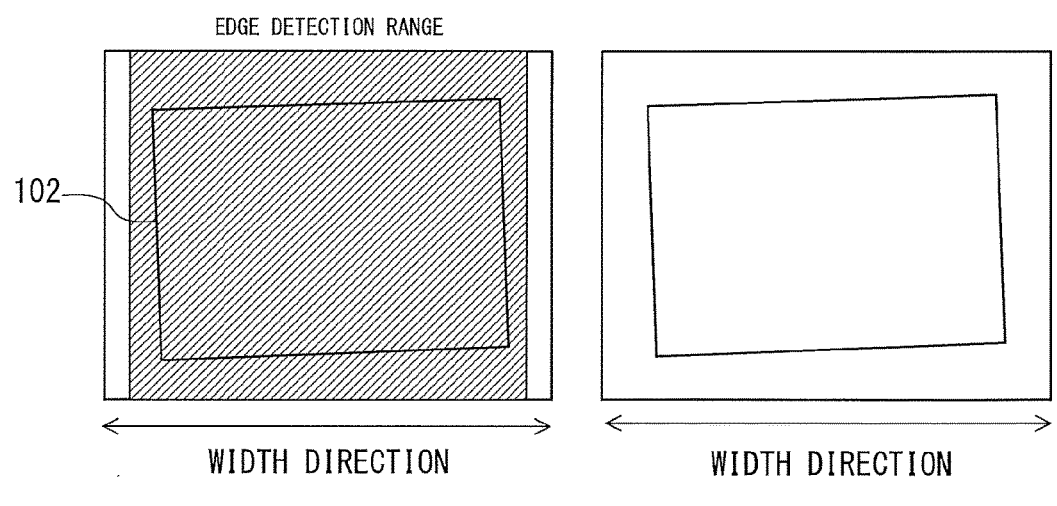

FIG. 6A to FIG. 6D are explanatory diagrams of the edge detecting processing. The original images illustrated in FIG. 6A and FIG. 6C represent edge images being the edge parts of the original 102. In FIG. 6A to FIG. 6D, the left-right direction indicates the width direction of the original 102. The edge image of the original 102 is generated from, for example, a color difference between the original background plate 109 and the original 102 and a shadow cast by the edge part of the original 102, which are included in the original image. The original image is an image within a maximum range that can be read by the CCD line sensor 203.

The hatching parts in FIG. 6A and FIG. 6C indicate the edge detection ranges specified by the CPU 401. The skew feed amount detector 405 conducts the edge detecting processing within the edge detection range. In FIG. 6A, edge detection ranges L and R are set in separate positions across the center part of the original 102 in the width direction. The edge detector 502 conducts the edge detecting processing within the above-mentioned edge detection ranges L and R, to thereby obtain edge detection results of FIG. 6B being edge images within the edge detection ranges L and R. In FIG. 6C, one edge detection range is set so as to include the center part of the original 102 in the width direction. The edge detector 502 conducts the edge detecting processing within the above-mentioned edge detection range, to thereby obtain an edge detection result of FIG. 6D being an edge image within the edge detection range. Data representing the edge detection results as illustrated in FIG. 6B and FIG. 6D is stored in the memory 503 for the edge detection data.

Figure 7:
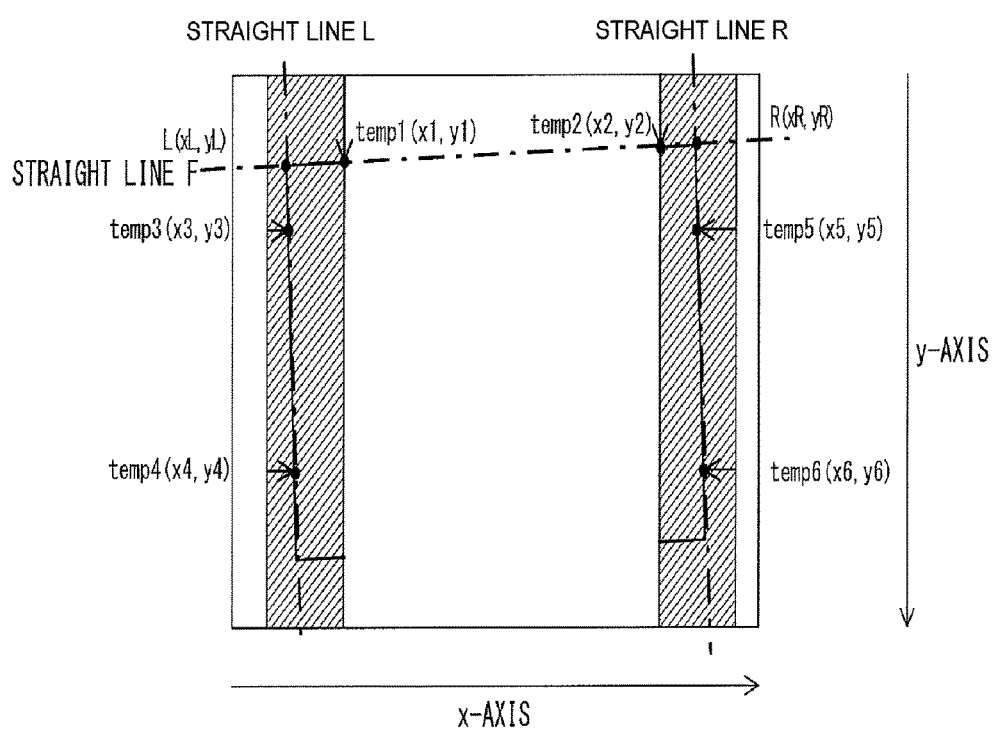
FIG. 7 is an explanatory diagram of processing for calculating coordinates of two vertices at a leading edge of a conveying direction of the original.

The skew feed amount calculator 504 is configured to acquire the edge detection result produced by the edge detector 502 from the memory 503 for the edge detection data, and to calculate a position (coordinates) of two vertices indicating the skew feed amount of the original 102. The coordinates of the two vertices to be calculated indicate the positions of the two vertices, which are different in the width direction of the original 102. For example, the skew feed amount calculator 504 calculates the coordinates of the two vertices of the original image, which form a leading edge of the original 102 in the conveying direction. FIG. 7 is an explanatory diagram of processing for calculating the coordinates of the two vertices of the original image, which form the leading edge of the original 102 in the conveying direction, from the edge detection results of FIG. 6B. In FIG. 7, the description is made assuming that the width direction of the original 102 is represented by the x-axis and the conveying direction of the original 102 is represented by the y-axis. The skew feed amount calculator 504 calculates primary expressions expressing a straight line L, a straight line R, and a straight line F from the edge detection results. The straight line F is a straight line passing through a position of the edge detection result for each of the edge detection range L and the edge detection range R on a center side in the width direction. The straight line L is a straight line of the edge detection result extending in the conveying direction of the original within the edge detection range L. The straight line R is a straight line of the edge detection result extending in the conveying direction of the original within the edge detection range R. An intersection point between the straight line L and the straight line F and an intersection point between the straight line R and the straight line F correspond to the coordinates of the two vertices of the original image. Referring to the flowchart of FIG. 8, the description is made of the processing for calculating the coordinates of two vertices of the original image from the edge detection results described above.

The skew feed amount calculator 504 retrieves a y-coordinate of the edge image, which is first found in a positive direction of the y-axis in a position with an x-coordinate having the maximum value within the edge detection range L, from the edge detection result of FIG. 6B (Step S801). When the edge image is successfully retrieved (Y in Step S802), the skew feed amount calculator 504 temporarily holds coordinates (first edge coordinates temp1 (x1,y1)) of the retrieved position (first edge position) (Step S803). When the edge image fails to be retrieved (N in Step S802), the skew feed amount calculator 504 notifies the CPU 401 of an error (Step S823).

Subsequently, the skew feed amount calculator 504 retrieves a y-coordinate of the edge image, which is first found in the positive direction of the y-axis in a position with an x-coordinate having the minimum value within the edge detection range R, from the edge detection result (Step S804). When the edge image is successfully retrieved (Y in Step S805), the skew feed amount calculator 504 temporarily holds coordinates (second edge coordinates temp2 (x2, y2)) of the retrieved position (second edge position) (Step S806). When the edge image fails to be retrieved (N in Step S805), the skew feed amount calculator 504 notifies the CPU 401 of an error (Step S823). The skew feed amount calculator 504 calculates the primary expression (y=aF·x+bF) expressing the straight line F based on the first edge coordinates temp1 (x1,y1) and the second edge coordinates temp2 (x2,y2) (Step S807).

The skew feed amount calculator 504 retrieves an x-coordinate of the edge image, which is first found in a positive direction of the x-axis from a position with an x-coordinate having the minimum value within the edge detection range L in a position (y3) moved from the y-coordinate (y1) of the first edge position toward the positive direction of the y-axis by a predetermined distance (Step S808). When the edge image is successfully retrieved (Y in Step S809), the skew feed amount calculator 504 temporarily holds coordinates (third edge coordinates temp3 (x3,y3)) of the retrieved position (third edge position) (Step S810). When the edge image fails to be retrieved (N in Step S809), the skew feed amount calculator 504 notifies the CPU 401 of an error (Step S823).

The skew feed amount calculator 504 retrieves an x-coordinate of the edge image, which is first found in the positive direction of the x-axis from the position with the x-coordinate having the minimum value within the edge detection range L in a position (y4) moved from the y-coordinate (y3) of the third edge position toward the positive direction of the y-axis by a predetermined distance (Step S811). When the edge image is successfully retrieved (Y in Step S812), the skew feed amount calculator 504 temporarily holds coordinates (fourth edge coordinates temp4 (x4, y4)) of the retrieved position (fourth edge position) (Step S813). When the edge image fails to be retrieved (N in Step S812), the skew feed amount calculator 504 notifies the CPU 401 of an error (Step S823). The skew feed amount calculator 504 calculates the primary expression (y=aL·x+bL) expressing the straight line L based on the third edge coordinates temp3 (x3,y3) and the fourth edge coordinates temp4 (x4,y4) (Step S814).

The skew feed amount calculator 504 retrieves an x-coordinate of the edge image, which is first found in a negative direction of the x-axis from a position with an x-coordinate having the maximum value within the edge detection range R in a position (y5) moved from the y-coordinate (y2) of the second edge position toward the positive direction of the y-axis by a predetermined distance (Step S815). When the edge image is successfully retrieved (Y in Step S816), the skew feed amount calculator 504 temporarily holds coordinates (fifth edge coordinates temp5 (x5,y5)) of the retrieved position (fifth edge position) (Step S817). When the edge image fails to be retrieved (N in Step S816), the skew feed amount calculator 504 notifies the CPU 401 of an error (Step S823).

The skew feed amount calculator 504 retrieves an x-coordinate of the edge image, which is first found in the negative direction of the x-axis from the position with the x-coordinate having the maximum value within the edge detection range R in a position (y6) moved from the y-coordinate (y5) of the fifth edge position toward the positive direction of the y-axis by a predetermined distance (Step S818). When the edge image is successfully retrieved (Y in Step S819), the skew feed amount calculator 504 temporarily holds coordinates (sixth edge coordinates temp6 (x6,y6)) of the retrieved position (sixth edge position) (Step S820). When the edge image fails to be retrieved (N in Step S819), the skew feed amount calculator 504 notifies the CPU 401 of an error (Step S823). The skew feed amount calculator 504 calculates the primary expression (y=aR·x+bR) expressing the straight line R based on the fifth edge coordinates temp5 (x5,y5) and the sixth edge coordinates temp6 (x6,y6) (Step S821).

The skew feed amount calculator 504 calculates the intersection point between the straight line F and the straight line L and the intersection point between the straight line F and the straight line R from the straight line F, the straight line L, and the straight line R obtained in the above-mentioned processing. The skew feed amount calculator 504 thus acquires coordinates L (xL,yL) of a top left vertex and coordinates R (xR,yR) of a top right vertex of the leading edge of the original 102 in the conveying direction. The skew feed amount calculator 504 outputs the acquired coordinates L (xL,yL) of the top left vertex and the acquired coordinates R (xR,yR) of the top right vertex to the CPU 401 as the skew feed amount (Step S822).

Figure 9:
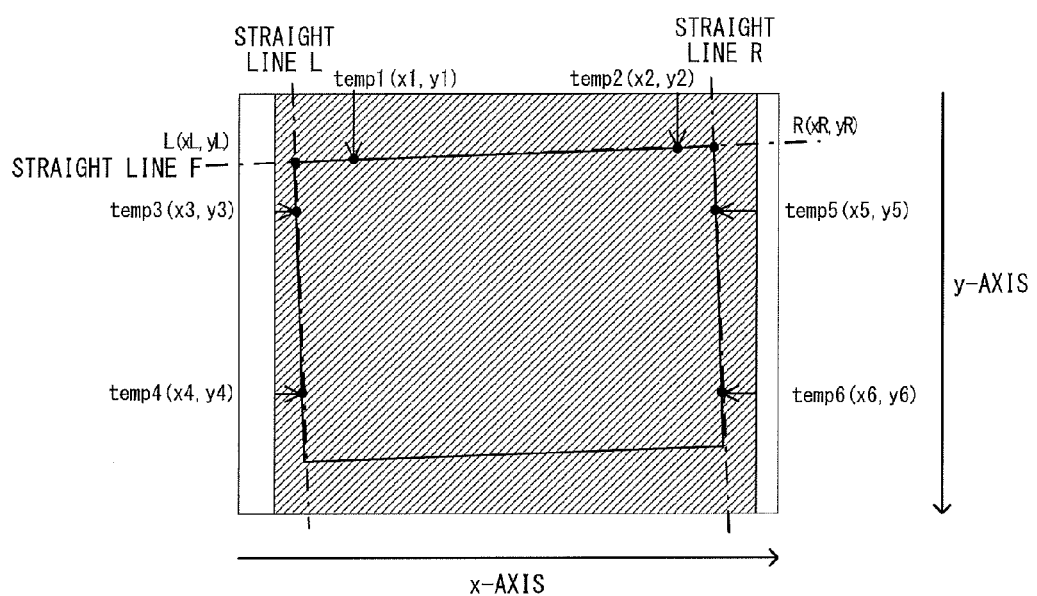
FIG. 9 is an explanatory diagram of the processing for calculating the coordinates of two vertices at the leading edge of the conveying direction of the original.
Figure 10:
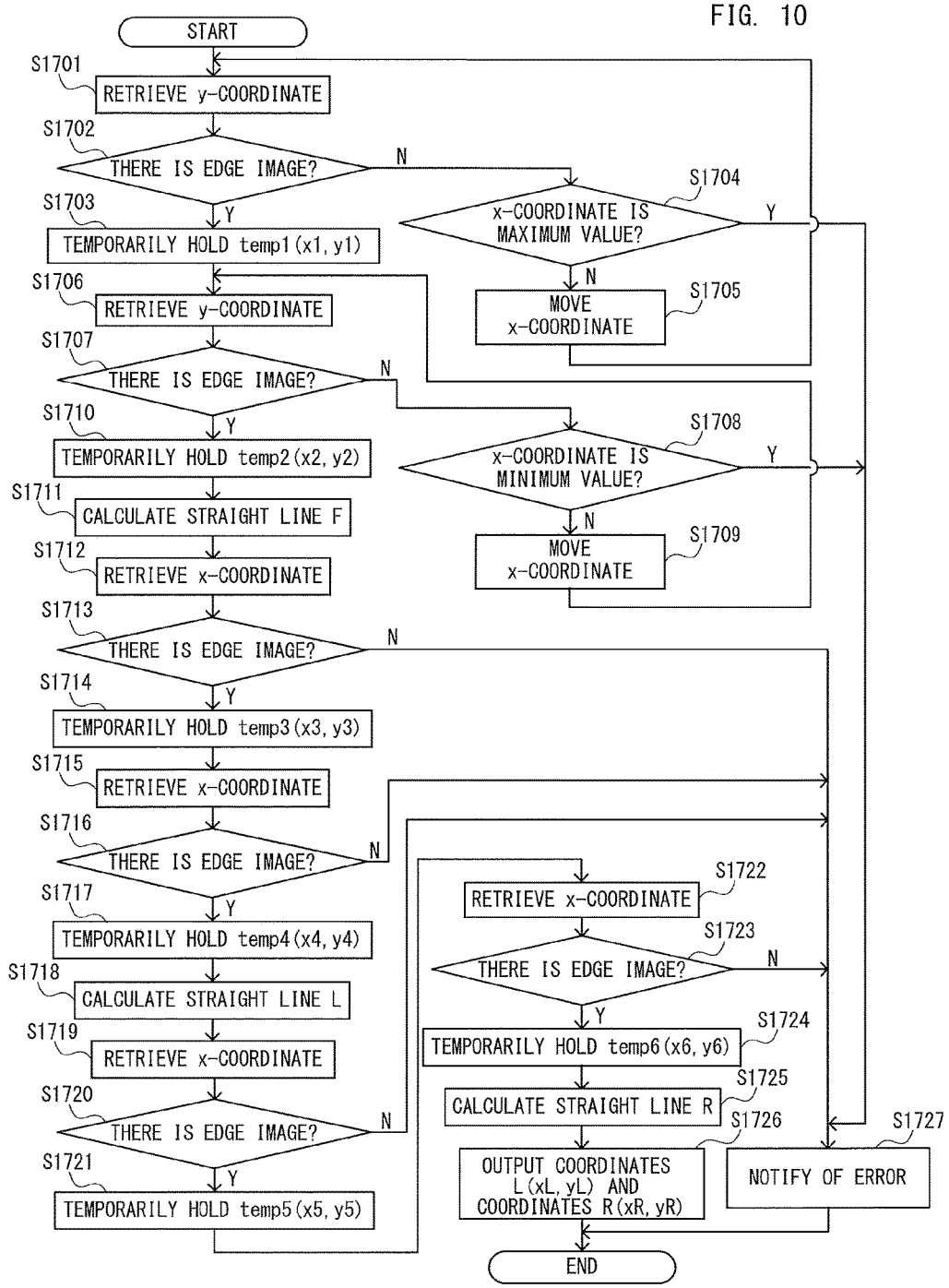
FIG. 10 is a flowchart for illustrating the processing for calculating the coordinates of two vertices at the leading edge of the conveying direction of the original.

FIG. 9 is an explanatory diagram of the processing for calculating the coordinates of two vertices of the original image, which form the leading edge of the original 102 in the conveying direction, from the edge detection result of FIG. 6D. In FIG. 9, the description is made assuming that the width direction of the original 102 is represented by the x-axis and the conveying direction of the original 102 is represented by the y-axis. The skew feed amount calculator 504 calculates the primary expressions expressing the straight line L, the straight line R, and the straight line F from the edge detection result. The straight line F is a straight line extending in the width direction within the edge detection range. The straight line L and the straight line Rare each a straight line of the edge detection result extending in the conveying direction of the original within the edge detection range. The intersection point between the straight line L and the straight line F and the intersection point between the straight line R and the straight line F correspond to the coordinates of the two vertices of the original image. Referring to the flowchart of FIG. 10, the description is made of the processing for calculating the coordinates of two vertices of the original image from the edge detection result described above. When the coordinates of the two vertices of the original image are calculated from the edge detection result of FIG. 6D, processing for calculating the straight line F is different from the case of using the edge detection results of FIG. 6B. Processing for calculating the straight line L and the straight line R is conducted in the same manner as in the case of using the edge detection results of FIG. 6B.

The skew feed amount calculator 504 retrieves a y-coordinate of the edge image, which is first found in the positive direction of the y-axis in a position (x1) of the x-coordinate moved from a position with an x-coordinate having the minimum value within the edge detection range toward the positive direction of the x-axis by a predetermined distance, from the edge detection result of FIG. 6D (Step S1701). When the edge image is successfully retrieved (Y in Step S1702), the skew feed amount calculator 504 temporarily holds coordinates (first edge coordinates temp1 (x1,y1)) of the retrieved position (first edge position) (Step S1703). When the edge image fails to be retrieved (N in Step S1702), the skew feed amount calculator 504 searches for the y-coordinate while moving the position of the x-coordinate toward the positive direction of the x-axis by a predetermined distance (N in Step S1704, Step S1705, and Step S1701). After the x-coordinate keeps being shifted, when the y-coordinate fails to be retrieved even with the maximum value that allows the shifting (Y in Step S1704), the skew feed amount calculator 504 notifies the CPU 401 of an error (Step S1727).

Subsequently, the skew feed amount calculator 504 retrieves a y-coordinate of the edge image, which is first found in the positive direction of the y-axis in a position (x2) of the x-coordinate moved from a position with an x-coordinate having the maximum value within the edge detection range toward the negative direction of the x-axis by a predetermined distance, from the edge detection result (Step S1706). When the edge image is successfully retrieved (Y in Step S1707), the skew feed amount calculator 504 temporarily holds coordinates (second edge coordinates temp2 (x2,y2)) of the retrieved position (second edge position) (Step S1710). When the edge image fails to be retrieved (N in Step S1707), the skew feed amount calculator 504 searches for the y-coordinate while further moving the position of the x-coordinate toward the negative direction of the x-axis by a predetermined distance (N in Step S1708, Step S1709, and Step S1706). After the x-coordinate keeps being shifted, when the y-coordinate fails to be retrieved even with the maximum value that allows the shifting (Y in Step S1708), the skew feed amount calculator 504 notifies the CPU 401 of an error (Step S1727). The skew feed amount calculator 504 calculates the primary expression (y=aF·x+bF) expressing the straight line F based on the first edge coordinates temp1 (x1,y1) and the second edge coordinates temp2 (x2,y2) (Step S1711).

Figure 8:
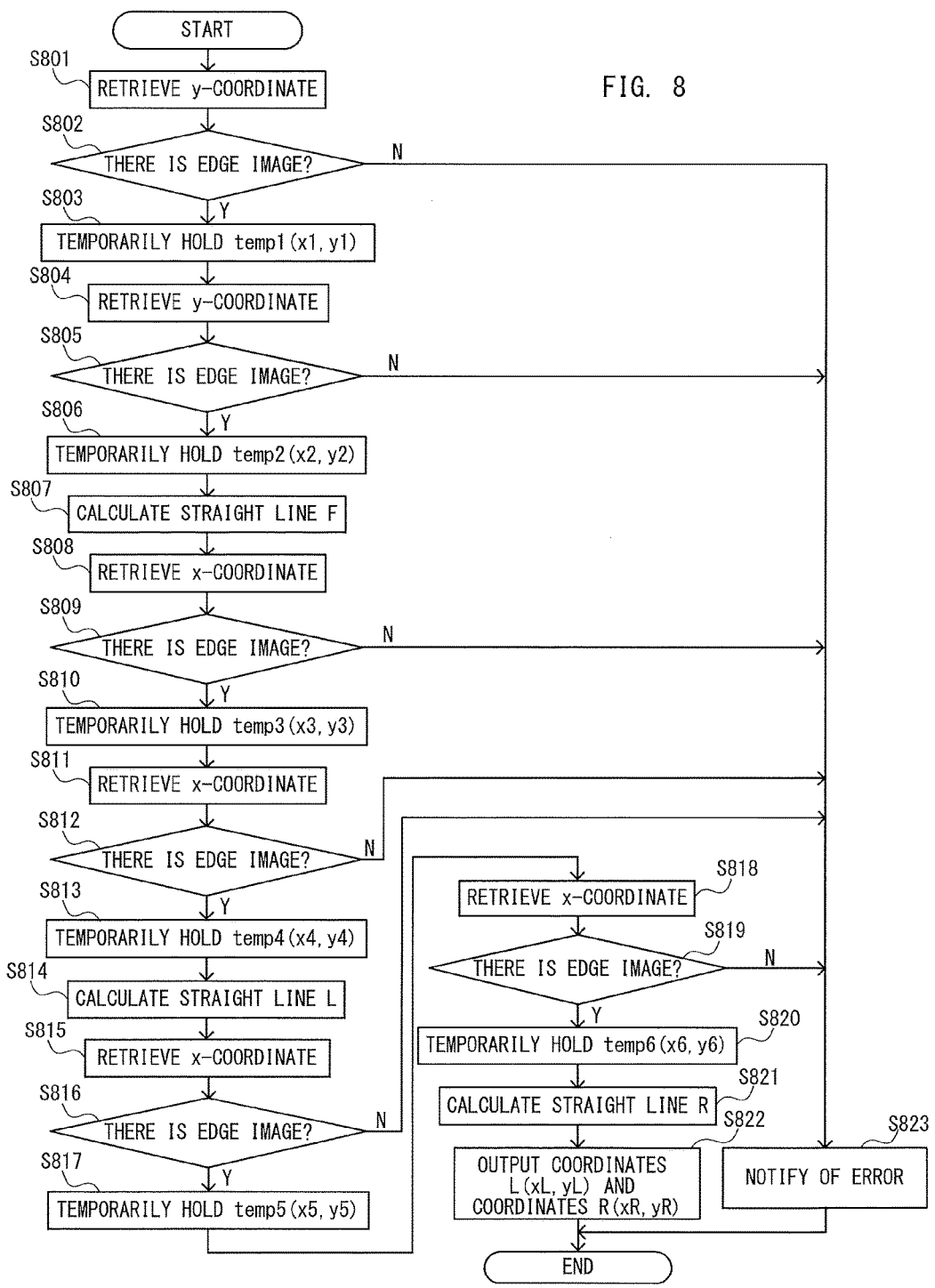
FIG. 8 is a flowchart for illustrating the processing for calculating the coordinates of two vertices at the leading edge of the conveying direction of the original.

After calculating the straight line F, the skew feed amount calculator 504 calculates the straight line L and the straight line R by the same processing as the processing of from Step S808 to Step S823 of FIG. 8, acquires the coordinates L (xL,yL) and the coordinates R (xR,yR), and outputs the acquired coordinates to the CPU 401 (Step S1712 to Step S1727).

Figure 11:
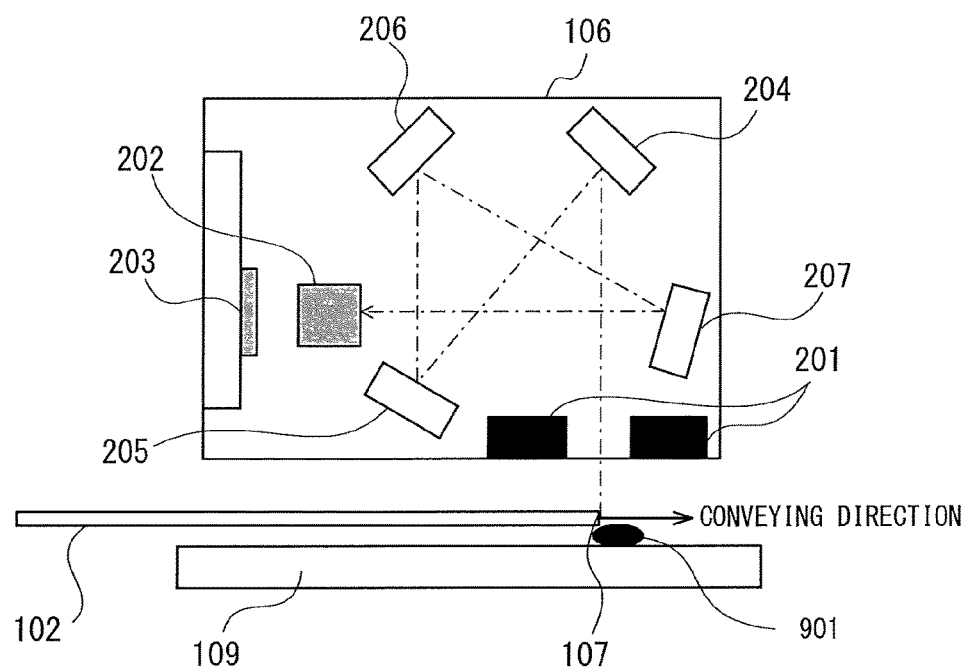
FIG. 11 is a diagram for illustrating an example of a state in which dust has occurred.

The edge detection range is described. In the image reading apparatus, dust, a stain, or the like may occur in the image reading position 107. FIG. 11 is a diagram for illustrating an example of a state in which dust 901 has occurred in the image reading position 107. The dust 901 occurs when, for example, at a time of reading the original 102 after correction with correction fluid and before the correction fluid dries, the correction fluid peels off and adheres to the original background plate 109 or the like. When the dust 901 falls out of the conveyance route 110 of the original 102 and occurs within a reading range of the image reader 106, the image reading apparatus reads the dust 901 as an original image.

Figure 12:
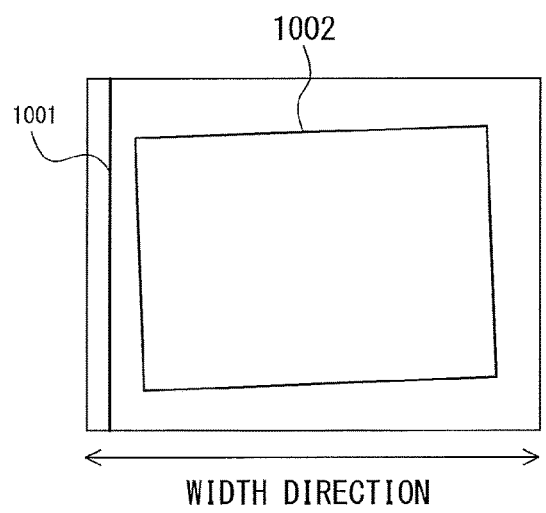
FIG. 12 is a diagram for illustrating an example of an original image obtained when the dust is read.

FIG. 12 is a diagram for illustrating an example of the original image obtained when the dust 901 is read as an original image. An edge image 1002 of the original 102 and a straight line image 1001 due to the dust 901, which extends in the conveying direction (sub-scanning direction) of the original, are included in the original image. When the edge detection is conducted from the entire image by a related-art method, the straight line image 1001 due to the dust 901 is detected as the edge part.

Figure 13:
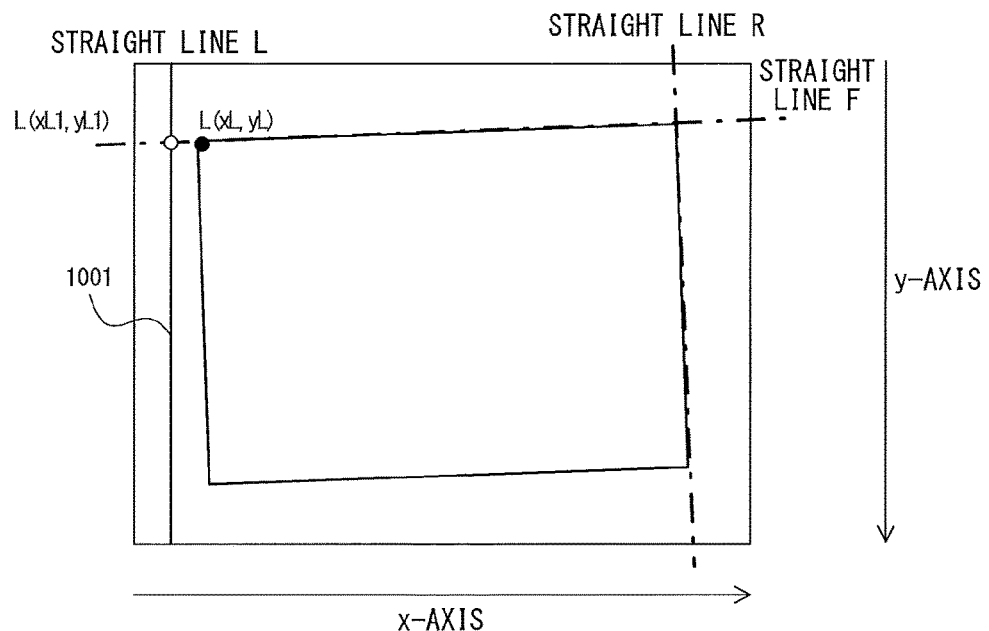
FIG. 13 an explanatory diagram of coordinates of a top left vertex of the original image.

FIG. 13 is an explanatory diagram of the coordinates L of the top left vertex of the original image obtained when the processing of FIG. 8 is conducted based on the original image of FIG. 12 without setting the edge detection ranges L and R. The straight line image 1001 due to the dust 901 is calculated as the straight line L. Therefore, the skew feed amount calculator 504 acquires coordinates (xL1,yL1) indicated by the white dot as the top left vertex of the original image instead of the coordinates L (xL,yL) of the actual top left vertex of the original image indicated by the black dot. The edge detection range is set in order to prevent such erroneous detection of the vertex of the original image. Through the setting of the edge detection range, the straight line image 1001 that occurs due to the dust 901 is excluded from a target range of the edge detection. This inhibits the skew feed amount detector 405 from erroneously detecting the straight line image 1001 that occurs due to the dust 901 as the edge part.

The edge detection range is set based on a size of the original 102. The CPU 401 verifies the size of the original 102 based on the resistance value of the volume resistor 104 that fluctuates in association with the interval between the two original guides 103. The CPU 401 can verify to some extent where the edge part of the original 102 is in the width direction based on the size of the original 102. Even when the original 102 is subjected to skew feeding, the CPU 401 sets a predetermined range including a position in which the edge part of the original 102 is estimated to fall as the edge detection range in order to enable recognition of the edge part of the original 102 in the width direction. The CPU 401 thus sets the edge detection range so that the edge detection is conducted within the range excluding the straight line image 1001 due to the dust 901, to thereby suppress an influence of the dust 901 to a minimum.

Figure 14:
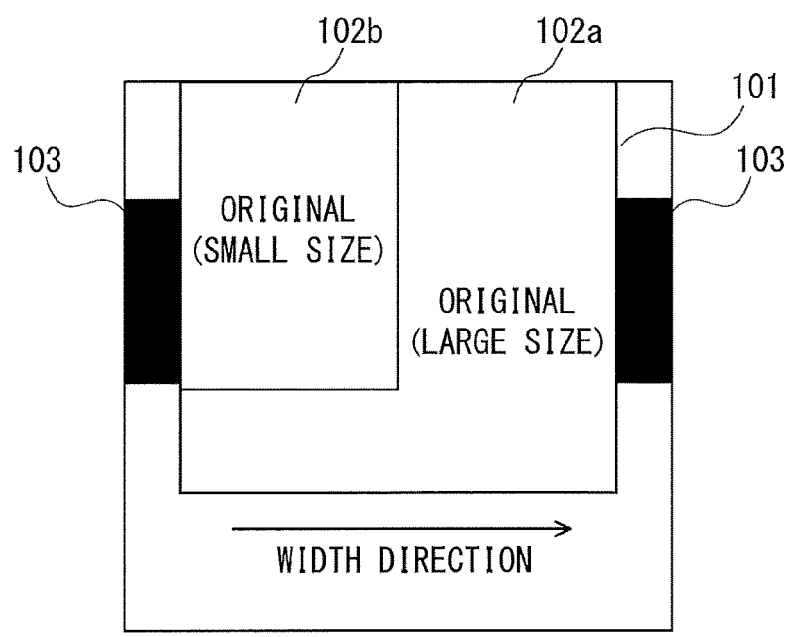
FIG. 14 is a diagram for illustrating a state in which a plurality of originals having different sizes are placed on an original tray.

There is a case where a plurality of originals 102 having different sizes are placed on the original tray 101 and the image reading apparatus continuously reads original images from those originals 102. In this case, the CPU 401 can verify only the maximum size of the plurality of originals 102 from the interval between the two original guides 103. FIG. 14 is an illustration indicating a state in which the plurality of originals 102 having different sizes are placed on the original tray 101. The interval between the two original guides 103 indicates the original width of the original 102a having the maximum size, but does not indicate the original width of the original 102b having a size smaller than that of the original 102a. In this case, when the edge detection ranges L and R are set based on the original 102a having the maximum size as illustrated in FIG. 6B, a problem occurs in the edge detection for the original 102b having the smaller size.

Figure 15A:
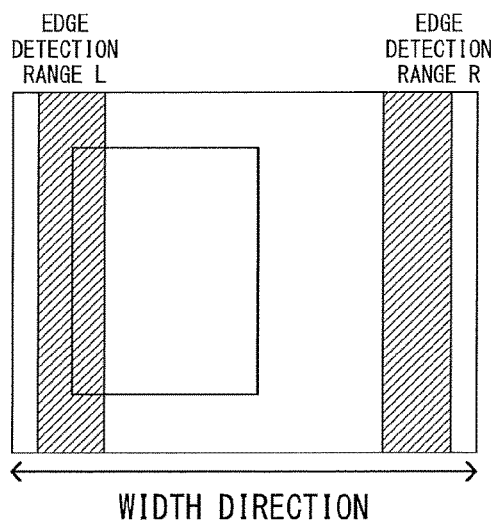
FIG. 15A and FIG. 15B are explanatory diagrams of a case where an edge of an original having a small size is detected.
Figure 15B:
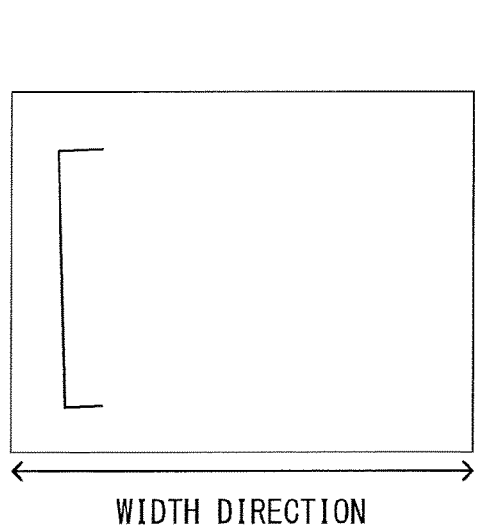

FIG. 15A and FIG. 15B are explanatory diagrams of a case where the edge detection has been conducted by setting the edge detection ranges L and R for the original image obtained by reading the original 102b having the smaller size. The edge detection ranges L and R are set as illustrated in FIG. 15A. The edge image is to be detected as illustrated in FIG. 15B. A left end part of the original image is included in the edge detection range L, while a right end part of the original image is not included in the edge detection range R. Hence, the edge part of the left end part of the original image is detected, while the edge part of the right end part is not detected. Therefore, in order to accurately conduct the edge detection for the original image of the original 102b having the smaller size, the CPU 401 sets the edge detection range as illustrated in FIG. 6C. The edge detection range of FIG. 6C is set so as to include the original width of the original 102a having the maximum size. The edge detector 502 sets the edge detection range based on the detection range setting instruction acquired from the CPU 401.

Figure 16:
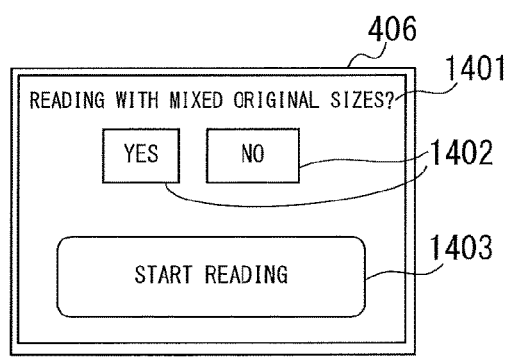
FIG. 16 is an explanatory diagram of a setting screen.

The user can specify whether to set the edge detection range as illustrated in FIG. 6A or to set the edge detection range as illustrated in FIG. 6C using the operation unit 406. The CPU 401 displays, for example, a setting screen exemplified in FIG. 16 on the display of the operation unit 406. The setting screen includes a message 1401 indicating whether the original image is to be read from the originals 102 having a mixture of a plurality of different sizes, selection buttons 1402, and a button 1403 for instructing to start reading or not. The user inputs whether the originals 102 have the same size or have a mixture of a plurality of sizes through the selection buttons 1402. For the mixed original sizes, the user selects the selection button 1402 indicating "YES". For the same original size, the user selects the selection button 1402 indicating "NO". When the button 1403 for instructing to start reading is selected, the controller 400 controls the image reading apparatus to start the image reading processing. The CPU 401 detects the maximum size of the original 102 placed on the original tray 101 based on the instruction to start the image reading processing, which is input when the button 1403 for instructing to start reading is selected. The CPU 401 transmits, to the edge detector 502, the detection range setting instruction for setting the edge detection range based on the detected original width and a selection result of the selection buttons 1402.

FIG. 17 is tables for showing a specific example of the edge detection ranges corresponding to the original sizes. In FIG. 17, the edge detection ranges are expressed with the center of the original tray 101 in the width direction as a reference (0 mm). Two edge detection ranges are separately set for the same size of the original 102, while one edge detection range is set for the mixed sizes. The CPU 401 stores such tables for showing relationships between the original size and the edge detection range in a predetermined memory, and determines which of the tables is to be used based on the instruction received through the operation unit 406. After determining the table, the CPU 401 acquires the size of the original 102 corresponding to the resistance value of the volume resistor 104. The CPU 401 refers to the table to determine the edge detection range corresponding to the acquired size of the original 102 (original width), and transmits the detection range setting instruction indicating the determined edge detection range to the skew feed amount detector 405.

The skew feed corrector 408 conducts, based on the instruction received from the CPU 401, processing for storing digital image data subjected to shading processing in the memory 407 and processing for generating image data by conducting the skew feed correction for the digital image data subjected to the shading processing. FIG. 18 is an explanatory diagram of the skew feed correction. At a time of the skew feed correction, the skew feed corrector 408 acquires, from the CPU 401, the coordinates L (xL,yL) of the top left vertex and the coordinates R (xR,yR) of the top right vertex of the original image that have been detected by the skew feed amount detector 405. The skew feed corrector 408 subjects the digital image data stored in the memory 407 to affine transformation using the coordinates L (xL,yL) and the coordinates R (xR,yR) that have been acquired, and generates image data subjected to the skew feed correction. In FIG. 18, the image data obtained by conducting the skew feed correction for the original image of FIG. 6A is illustrated.

Figure 19:
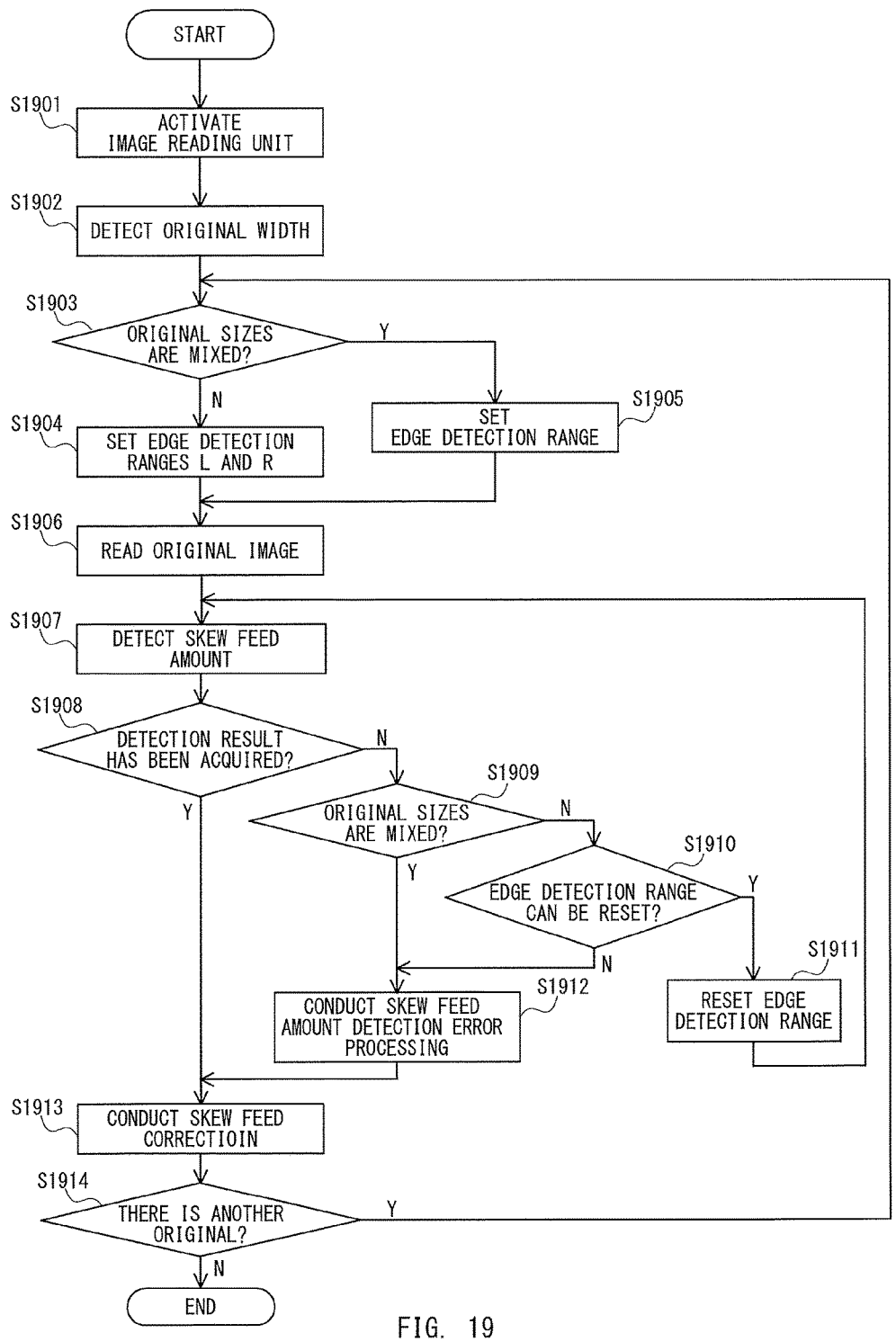
FIG. 19 is a flowchart for illustrating image reading processing.

The image reading apparatus configured as described above conducts the image reading processing based on a flowchart illustrated in FIG. 19. The image reading apparatus executes the image reading processing based on the instruction issued by the user through the operation unit 406.

When the image reading apparatus is powered on, the CPU 401 activates the image reader 106 (Step S1901). The CPU 401 activates the image reader 106 to prepare for the image reading to be conducted through the LED light source 201 and the CCD line sensor 203. The CPU 401 detects the maximum original width of the original 102 placed on the original tray 101 based on the resistance value of the volume resistor 104 (Step S1902).

The CPU 401 acquires a selection result indicating whether or not the sizes of the originals 102 are mixed from the operation unit 406 along with the instruction to start the image reading processing. When the sizes of the originals 102 are not mixed (N in Step S1903), the CPU 401 transmits an instruction to the skew feed amount detector 405 so as to instruct the skew feed amount detector 405 to set the edge detection ranges illustrated in FIG. 6A (Step S1904). When the sizes of the originals 102 are mixed (Y in Step S1903), the CPU 401 transmits an instruction to the skew feed amount detector 405 so as to instruct the skew feed amount detector 405 to set the edge detection range illustrated in FIG. 6C (Step S1905). The CPU 401 controls the skew feed amount detector 405 to set a range associated with the tables shown in FIG. 17 as the edge detection range so that the edge detection range corresponding to the original width can be set.

When the edge detection range is set, the CPU 401 drives the original conveying motor 105 to start conveying the original 102, and controls the image reader 106 to read the original. The image reader 106 inputs the analog image data representing the original image to the controller 400. The controller 400 converts the analog image data into digital image data, and subjects the digital image data to the shading correction. The CPU 401 controls the skew feed corrector 408 to store the digital image data subjected to the shading correction in the memory 407 (Step S1906).

The CPU 401 controls the skew feed amount detector 405 to conduct skew feed amount detecting processing (Step S1907). The CPU 401 acquires the coordinates L (xL,yL) of the top left vertex and the coordinates R (xR,yR) of the top right vertex of the original image as a detection result of the skew feed amount. When the detection result is successfully acquired normally (Y in Step S1908), the CPU 401 transmits the detection result of the skew feed amount to the skew feed corrector 408, and controls the skew feed corrector 408 to conduct the skew feed correction for the digital image data (Step S1913). When the detection result fails to be acquired normally (N in Step S1908), the CPU 401 verifies whether the mixture of the sizes of the originals 102 has been selected in the processing of Step S1903 (Step S1909) or not. The case where "the detection result fails to be acquired normally" represents a case where, for example, the coordinates of the two vertices fail to be acquired.

When the mixture of the sizes of the originals 102 is selected (Y in Step S1909), the CPU 401 conducts skew feed amount detection error processing. In this case, the CPU 401 sets the skew feed amount to "0", and outputs the entire digital image data stored in the memory 407 as the image data as it is to the skew feed corrector 408 (Step S1912 and Step S1913). When the mixture of the sizes of the originals 102 is not selected (N in Step S1909), the CPU 401 determines whether or not the edge detection range can be reset (Step S1910).

Figure 20:
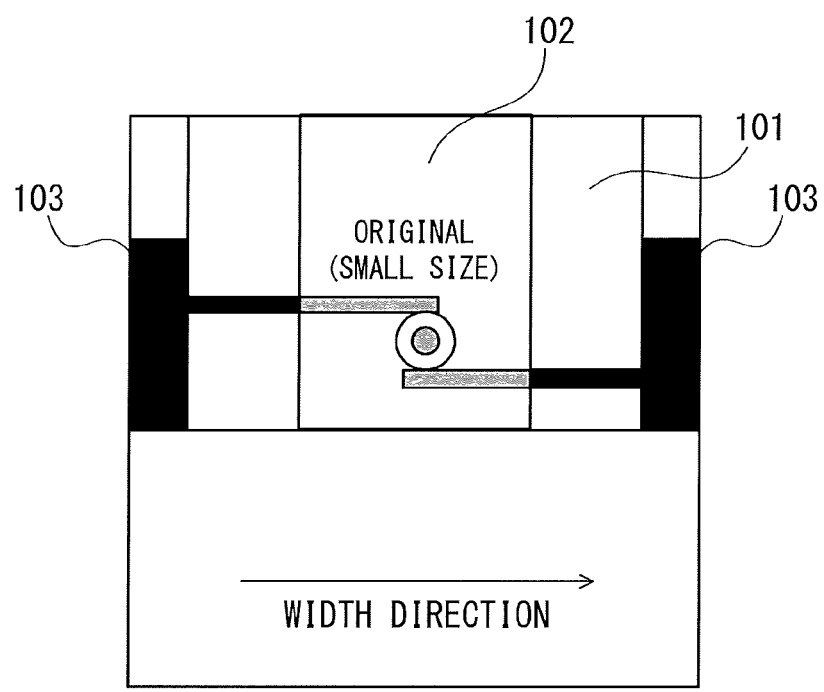
FIG. 20 is an explanatory diagram of a case where the original is placed inside an original guide.

When the edge detection range can be reset (Y in Step S1910), the CPU 401 resets the edge detection range for the skew feed amount detector 405, and controls the skew feed amount detector 405 to conduct the skew feed amount detecting processing (Step S1911 and Step S1907). The edge detection range is reset on the assumption that the original 102 may be placed inside the original guides 103. For example, as illustrated in FIG. 20, when the user does not control the original guides 103 to slide into abutment with the edge part of the original 102, the CPU 401 fails to correctly recognize the size of the original 102. In this case, the edge part of the original image cannot be detected as illustrated in FIG. 15, and the edge detection range is reset to detect the skew feed amount again.

When the edge detection range cannot be reset (N in Step S1910), the CPU 401 conducts the skew feed amount detection error processing. In this case, the CPU 401 sets the skew feed amount to "0", and controls the skew feed corrector 408 to output the entire digital image data stored in the memory 407 as the image data as it is (Step S1912 and Step S1913).

When the output of the image data is finished, the CPU 401 continues conducting the image reading when there is an original 102 remaining on the original tray 101 (Y in Step S1914 and Step S1903). When there is no original 102 remaining on the original tray 101, the CPU 401 brings the image reading processing to an end (N in Step S1914). Presence or absence of the original 102 on the original tray 101 can be examined by, for example, providing the original tray 101 with a sensor configured to detect the presence or absence of the original 102.

With the above-mentioned processing, the image reading apparatus detects the edge part of the original from the image within the edge detection range, to thereby be able to accurately detect an inclination amount of the original by recognizing the edge part of the original image with high precision while suppressing the influence of the dust, the stain, or the like even when the dust, the stain, or the like adheres to a background part. Therefore, the image reading apparatus can conduct the skew feed correction for the original image. In this embodiment, the original width of the original 102 placed on the original tray 101 is detected based on the resistance value of the volume resistor 104, but a sensor configured to detect the original width may be provided on the conveyance route 110 of the original 102. Further, the image reading apparatus may be configured to conduct such control as to acquire information for the image reading (for example, type specified by the user when the originals having different sizes are placed) from the user through the operation unit 406 and to narrow down the edge detection range based on the information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-216635, filed Nov. 4, 2015 which is hereby incorporated by reference herein in its entirety.

What is claimed is:

1. An image reading apparatus, comprising:
   a tray on which an original is to be placed;
   a conveyor configured to convey the original placed on the tray;
   an original width detector configured to detect a size of the original in a width direction perpendicular to a conveying direction of the original;
   an image reader configured to read an image of the original being conveyed by the conveyor to output image data;
   a skew feed amount detector configured to:
      set two edge detection areas across a center part of the original in the width direction based on the size of the original in the width direction detected by the original width detector;
      detect edge parts of the original based on the image data within the two edge detection areas; and
      detect a skew feed amount from the width direction of the original based on the edge part; and
   a skew feed corrector configured to perform skew feed correction for the image data based on the skew feed amount.

2. The image reading apparatus according to claim 1, wherein:
   the skew feed amount detector is configured to calculate positions of different two vertices in the width direction from the edge parts as the skew feed amount; and
   the skew feed corrector is configured to perform the skew feed correction for the image data based on the positions of the two vertices.

3. The image reading apparatus according to claim 1, wherein:
   the image reader is configured to continuously read images from a plurality of the originals having the same size; and
   the skew feed amount detector is configured to set the two edge detection areas in two separate positions across a center part of the original in the width direction.

4. The image reading apparatus according to claim 3, wherein the skew feed amount detector is configured to:
   calculate, from the edge parts, a first straight line extending in the conveying direction of the original within a first edge detection area, a second straight line extending in the conveying direction of the original within a second edge detection area, and a third straight line extending in the width direction; and
   calculate an intersection point between the first straight line and the third straight line and an intersection point between the second straight line and the third straight line as the skew feed amount.

5. The image reading apparatus according to claim 1, wherein the skew feed amount detector is configured to set the two edge detection areas based on a table for showing a relationship between the size of the original in the width direction and the two edge detection areas.

6. The image reading apparatus according to claim 5, further comprising:
   an input unit configured to input information indicating whether sizes of a plurality of the originals placed on the tray are the same or are different; and a memory configured to store a first table for showing a relationship between the size of the original in the width direction and the two edge detection areas, which is exhibited in a case where the sizes of the plurality of the originals are the same, and a second table for showing a relationship between a maximum size of the original in the width direction and the two edge detection areas, which is exhibited in a case where the sizes of the plurality of the originals are different, wherein the skew feed amount detector is configured to set the two edge detection areas using any one of the first table and the second table based on the information input through the input unit.

7. The image reading apparatus according to claim 1, further comprising an input unit configured to receive an instruction issued by a user, wherein the skew feed amount detector is configured to set one detection area in a case where it is specified through the input unit that originals having different sizes in the width direction are mixed on the tray, and set the two edge detection areas which are different from the one detection area in a case where it is specified otherwise.

8. The image reading apparatus according to claim 1, wherein:

the tray comprises two original guides configured to sandwich the placed original for registration; and the original width detector is configured to detect the size of the original in the width direction based on an interval between the two original guides.

9. The image reading apparatus according to claim 1, wherein the skew feed amount detector is configured to acquire the edge parts by resetting the two edge detection areas when the skew feed amount fails to be detected.

10. The image reading apparatus according to claim 1, wherein the skew feed corrector is configured to inhibit the skew feed correction from being conducted when the skew feed amount fails to be detected.

11. An image reading method which is executed by an image reading apparatus, wherein the image reading apparatus comprises:

a tray on which an original is to be placed;

a conveyor configured to convey the original placed on the tray;

an image reader configured to read an image of the original being conveyed by the conveyor, and to output image data; and an original width detector configured to detect a size of the original in a width direction perpendicular to a conveying direction of the original, wherein the image reading method comprises:

setting two edge detection areas across a center part of the original in the width direction based on the size of the original in the width direction detected by the original width detector;

detecting edge parts of the original based on the image data within the two edge detection areas;

detecting a skew feed amount from the width direction of the original based on the edge part; and performing skew feed correction for the image data based on the skew feed amount.

12. An image reading apparatus, comprising:

a tray on which an original is to be placed;

a conveyor configured to convey the original placed on the tray;

an original guide configured to regulate the placed original for registration in a width direction perpendicular to a conveying direction of the original;

an image reader configured to read an image of the original being conveyed by the conveyor to output image data; and a skew feed corrector configured to:

detect edge parts of the original in the width direction based on the image data within two edge detection areas which correspond to both edges of the original in the width direction, by using information concerning a position of the original guide;

detect a skew feed amount from the width direction of the original based on the edge parts; and perform skew feed correction for the image data based on the detected edge parts.

13. The image reading apparatus according to claim 12, further comprising:

an input unit configured to input information indicating whether sizes, in the width direction, of a plurality of the originals placed on the tray are the same or are different;

wherein the information indicates that the skew feed correction for the image data based on the detected edge parts is to be performed in a case where the sizes of the plurality of the originals placed on the tray are the same.

14. the image reading apparatus according to claim 12, wherein:

the skew feed corrector is configured to calculate positions of different two vertices in the width direction from the edge parts; and the skew feed corrector is configured to perform the skew feed correction for the image data based on the positions of the two vertices.

15. The image reading apparatus according to claim 12, wherein the skew feed corrector is configured to acquire the edge parts by resetting the two edge detection areas when the skew feed amount fails to be detected.

* * * * *